May 2, 1944.                M. BOWERMAN                2,347,986
                            WHEEL STARTER
                          Filed Oct. 13, 1941
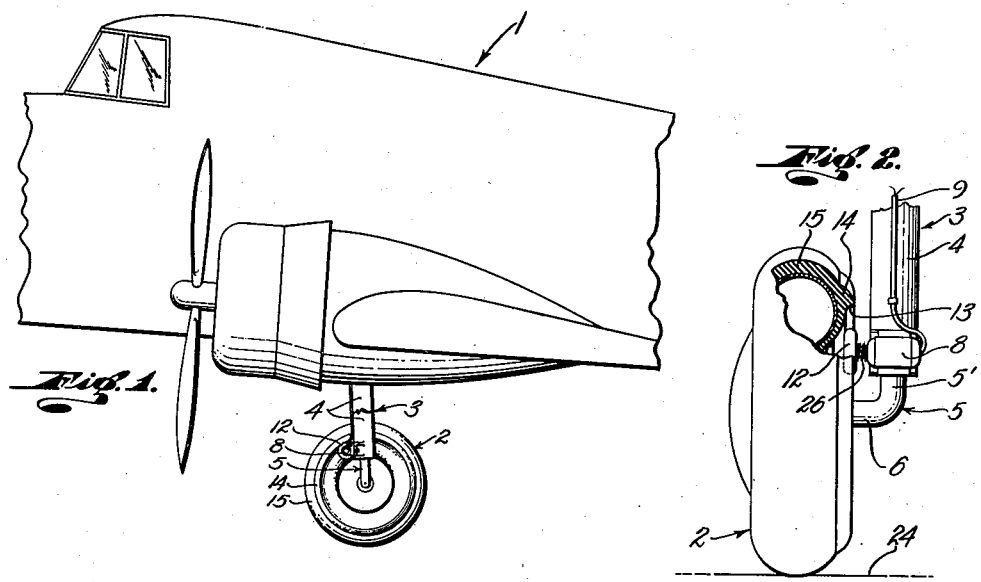
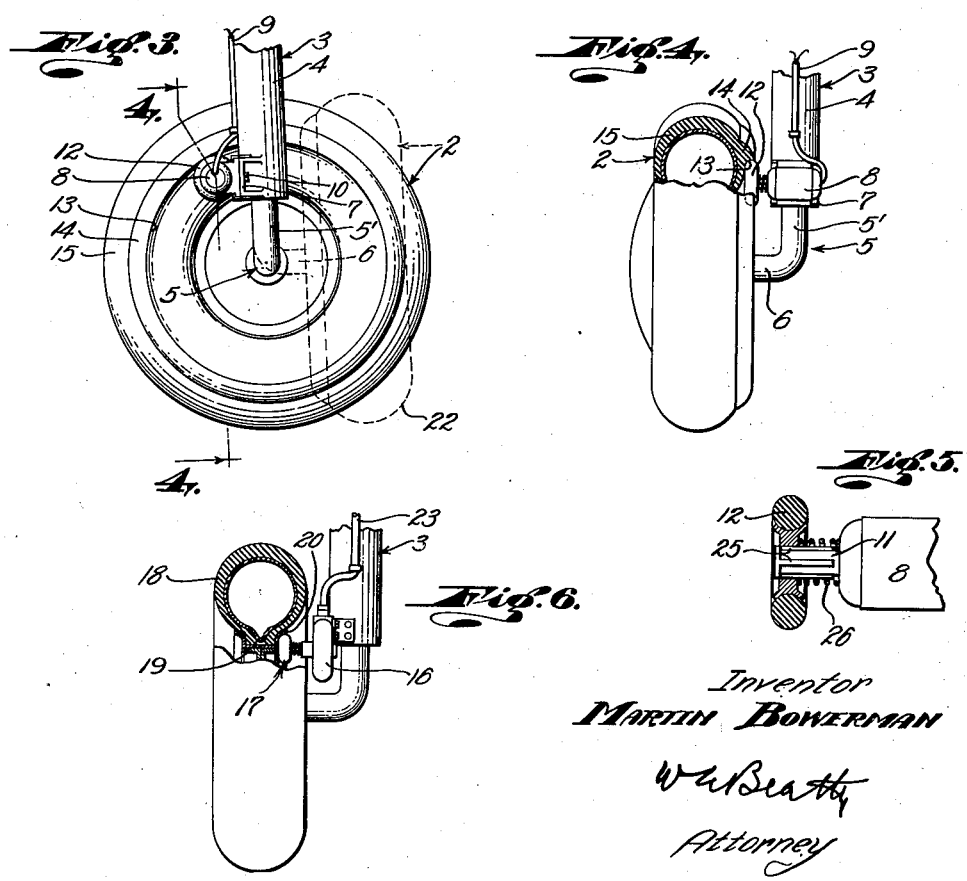
Inventor
MARTIN BOWERMAN
W H Beatty
Attorney Patented May 2, 1944

2,347,986

UNITED STATES PATENT OFFICE 2,347,986

WHEEL STARTER

Martin Bowerman, Alhambra, Calif.

Application October 13, 1941, Serial No. 414,714

5 Claims. (Cl. 244—103)

The invention relates to a starter for the wheels pertaining to the landing gear of aircraft. When an aircraft approaches a landing field, the landing gear, which is usually retractable, is operated to extend the landing gear from a recess in the fuselage of the aircraft so that the wheels will be in position to contact the ground when the aircraft lands. Just before landing, the aircraft is moving with respect to the ground, while the wheels are not revolving on their own axes, whereby they are caused to rotate at the landing speed as soon as the wheels touch the ground. The rotational speed of the wheel is thus instantly changed from substantially zero to a very high value, resulting in shock and strain on the wheels and landing gear.

An object of the invention is to set the wheels into rotation as soon as the landing gear has been retracted, the wheels being caused to rotate at a speed approximately the same as the landing speed of the aircraft. The difference in the speed of the wheel about its own axis and the landing speed, is thereby reduced to substantially zero or to a safe value.

A further object of the invention is to set the wheels in motion before landing, by means which automatically becomes ineffective when the weight of the plane is sustained by the landing gear, whereby the wheels are free from their preliminary driving means as soon as the wheels are driven by contact with the ground.

Another object of the invention is to provide a wheel starter which is simple in construction, free from the use of gears, and operable by electrical, hydraulic or other power.

For further details of the invention, reference may be made to the drawing wherein Fig. 1 is a view in side elevation of a portion of a typical aircraft having a landing gear to which the wheel starter of the present invention is applied, the wheel shown being on the far side of the aircraft.

Fig. 2 is an end elevational view of the wheel of Fig. 1, with the aircraft broken away and with the wheel starter disconnected from the wheel.

Fig. 3 is an enlarged side elevation of the wheel starter of Figs. 1 and 2, illustrating the wheel as being movable about the axis of its support as in certain types of landing gears.

Fig. 4 is a partial sectional view on line 4—4 of Fig. 4, looking in the direction of the arrows.

Fig. 5 is an enlarged vertical elevational view, partly in section with parts broken away, of the motor drive.

Fig. 6 is a partial sectional view of a modification of the motor and drive of Fig. 4.

Referring in detail to the drawing, 1 represents an aircraft having a pair of similar landing wheels of which the wheel 2 is on the far side of the aircraft 1. Wheel 2 is rotatably carried by a landing gear generally represented at 3. The landing gear 3 is indicative of landing gear which may be retracted within the fuselage of the aircraft 1 as is well-known. The landing gear 3 comprises a support 4 which is suitably carried by the aircraft 1 and which in turn carries an axle 5 here indicated as having one portion 5' which is coaxial with the support 4, and an offset portion 6 on which the wheel 2 is rotatably mounted. Between the support 4 and the axle portion 5', is arranged a cushion device, usually hydraulic, well-known and not shown, which is employed to absorb the shock of landing, and which permits relative movement of the support 4 and the axle-portion 5'.

In order to set the wheel 2 into rotation about its own axis prior to landing, I provide the support 4 with a base 7 on which I mount an electric motor 8 as shown in Fig. 4. The motor 8 has a power circuit 9 which is led to the pilot's position in any suitable manner. Motor 8 is connected to base 7 by means of bolts 10. The motor 8 has a shaft 11 provided with a spline 25 which slidingly carries a friction wheel 12 having a convex contour engageable, under tension by compression spring 26, with the similarly curved concave undersurface 13 of a bead 14 formed integral with the rubber tire 15 of the wheel 2.

If desired, the driving motor instead of being an electric motor 8 as in Figs. 3 and 4, may be an air motor as indicated at 16 in Fig. 6. Fig. 6 also illustrates another modification, namely that the friction drive 16 instead of engaging with the tire 18 of the wheel 19, may engage the under-surface of a rim 20 on which the tire 18 is mounted.

With certain types of retractable runner gear, the wheels are moved to a position so that the plane thereof is crosswise of the fuselage, as indicated in dotted lines at 22 in Fig. 3. This rotation of the wheel about the axis of the support 4 does not interfere with the use of my device because the convex curvature of the friction wheel 12 and the complementary concave surface 13 of the bead 14 are of such curvature as to permit the above described rotation. My invention is equally useful, whether the wheel is rotated to the position shown in dotted lines at 22 in Fig. 3 for retracting purposes or not, because it makes no difference as to whether the wheel 2 is rotated as just described to bring the friction drive 12 in engagement with the bead 14, or whether wheel 2 moves in its own plane to reach the position shown in full lines in Fig. 3. In any event, the full line position in Fig. 3 shows the relative position of the parts when the plane is about to land, and with the friction drive 12 in position to set the wheel 2 spinning to the desired speed under control of the pilot over the power circuit 9, or over the compressed air line 23 for the air motor 16 in Fig. 6. As soon as the wheel 2 sustains the weight of the aircraft 1 with the wheel 2 on the ground 24 as indicated in Fig. 2, the weight of the aircraft 1 acting through the cushion device not shown, moves the support 4 downwardly with respect to the axle portion 5', which moves the friction wheel 12 away from bead 14 in Fig. 4 (or friction wheel 17 away from rim 20 in Fig. 6) whereby the motor 8 in Fig. 4, or motor 16 in Fig. 6, is automatically uncoupled from the wheel 2.

It will be understood that the other landing wheel not shown, for the near side of aircraft 1, is provided on its inside face with a drive similar to and a mirror image of the drive above described for wheel 2.

It will be apparent that various modifications may be made in the invention without departing from the spirit of the following claims. For example, while this invention makes it possible to avoid the use of gears by reason of the fact that the friction wheel 12 is directly coupled to the motor shaft 11, if it is desired to drive the friction wheel 12 at a speed higher than the speed of shaft 11, suitable speed changing gears may be employed. Also, the bead 14 may be vulcanized onto a standard tire. Also, the wheel 12 and the surface 13 may be provided with corrugations to increase the friction.

I claim:

1. A wheel starter for aircraft having an axle, a wheel therefor, and a support for said axle, said axle having one portion coaxial with said support and having an offset portion for the wheel, said support permitting said wheel to pivot substantially about the axis of said support; said starter comprising a motor having a friction drive, and means supporting said motor on said axle support in such position that said friction drive is engageable with said wheel when said wheel is pivoted about the axis of said axle support to one position and disengageable therefrom when pivoted to another position.

2. A wheel starter for aircraft having an axle and wheel therefor, with means supporting said axle and said wheel for pivotal movement about an axis abaxial of said axle; said starter comprising a motor having a shaft and a driving element on said shaft, a driven element on said wheel, and means supporting said motor on said first mentioned supporting means in such position that said driving and driven elements may be coupled and uncoupled by pivoting said wheel on said first mentioned supporting means.

3. A wheel starter for aircraft having an axle and wheel therefor, with a telescopic cushion support for said axle and having retractive movement when the weight of the aircraft is supported by said wheel; said starter comprising a motor having a driving element, said wheel having a driven element engageable with said driving element, means supporting said motor on said telescopic support in such position that disengagement of said driving and driven elements may be effected by retractive movement of said telescopic support when the weight of the aircraft is supported by said wheel, and a circuit for controlling said motor when the aircraft is in flight.

4. A wheel starter for aircraft having a landing wheel, said starter comprising a motor having a shaft, a driving element slidable on said shaft, tensioning means for urging said driving element along said shaft, a driven element on said wheel, a mount for said motor movable with respect to the landing wheel, said motor mount permitting engagement of said driving and driven elements when the aircraft is in flight with the wheel in position for landing, and being movable to disengage said driving and driven elements when the weight of the aircraft is sustained by the wheel, and a circuit for said motor under control of an operator for spinning said wheel when the aircraft is about to land.

5. A wheel starter for aircraft having a retractable landing gear and wheel, said starter comprising a motor, a control circuit for said motor, a driving element on said motor and a cooperating driven element on said wheel, a mount for said motor on the landing gear in such position that movement of said wheel from retracted position to landing position couples said driving and driven elements.

MARTIN BOWERMAN.